United States Patent [19]

Jones

[11] Patent Number: 4,969,418
[45] Date of Patent: Nov. 13, 1990

[54] ANIMAL TRAINING SYSTEM

[76] Inventor: Derrick A. Jones, 212 Elm St., Hudson, Wis. 54016

[21] Appl. No.: 222,619

[22] Filed: Jul. 21, 1988

[51] Int. Cl.$^5$ .............................................. A01K 15/04
[52] U.S. Cl. ............................................ 119/29; 43/98
[58] Field of Search .................. 119/1, 29; 43/59, 98, 43/124; 361/232; 340/573

[56] References Cited

U.S. PATENT DOCUMENTS

| | | | |
|---|---|---|---|
| 796,241 | 8/1905 | McNair | 378/27 |
| 2,500,311 | 3/1950 | Fagen | 307/106 |
| 2,555,180 | 5/1951 | Adkins | 256/10 |
| 3,182,111 | 5/1964 | Hogue | 264/272.2 |
| 3,197,916 | 8/1965 | Cole, Jr. et al. | 43/98 |
| 3,366,854 | 1/1968 | Robinson | 43/98 |
| 3,388,497 | 6/1968 | Levine | 43/98 |
| 3,777,712 | 12/1973 | Gardner et al. | 119/29 |
| 3,823,691 | 7/1974 | Morgan | 119/29 |
| 4,074,456 | 2/1978 | Tidwell | 43/98 |
| 4,074,657 | 2/1978 | Senior et al. | 119/29 |
| 4,118,752 | 10/1978 | Iguchi | 361/232 |
| 4,196,429 | 4/1980 | Davis | 340/573 X |
| 4,202,293 | 5/1980 | Gonda et al. | 119/29 |
| 4,274,123 | 6/1981 | Rogers, Jr. | 43/98 |
| 4,335,682 | 6/1982 | Gonda et al. | 119/29 |
| 4,451,460 | 5/1984 | Hansen et al. | 514/920 X |
| 4,471,561 | 9/1984 | Lapierre | 361/232 X |
| 4,656,038 | 4/1987 | Baugh | 514/920 X |

FOREIGN PATENT DOCUMENTS

| | | | |
|---|---|---|---|
| 3639125 | 5/1987 | Fed. Rep. of Germany | 361/232 |
| 443773 | 2/1968 | Switzerland | 361/232 |

OTHER PUBLICATIONS

SCAT MAT brochure explaining how it works and the particulars.

*Primary Examiner*—Robert P. Swiatek
*Assistant Examiner*—R. Thomas Price
*Attorney, Agent, or Firm*—Foley & Lardner, Schwartz, Jeffery, Schwaab, Mack, Blumenthal & Evans

[57] ABSTRACT

An apparatus and method for training animals has active and passive components. The animal is trained to avoid entering an area by a mild shock which the animal received when it treads on a visible interdigital array. Eventually the animal is deterred by viewing the array alone and the shocking means is removed. The visible array can be supplemented with electroluminescent, olfactory or audio stimuli.

2 Claims, 3 Drawing Sheets

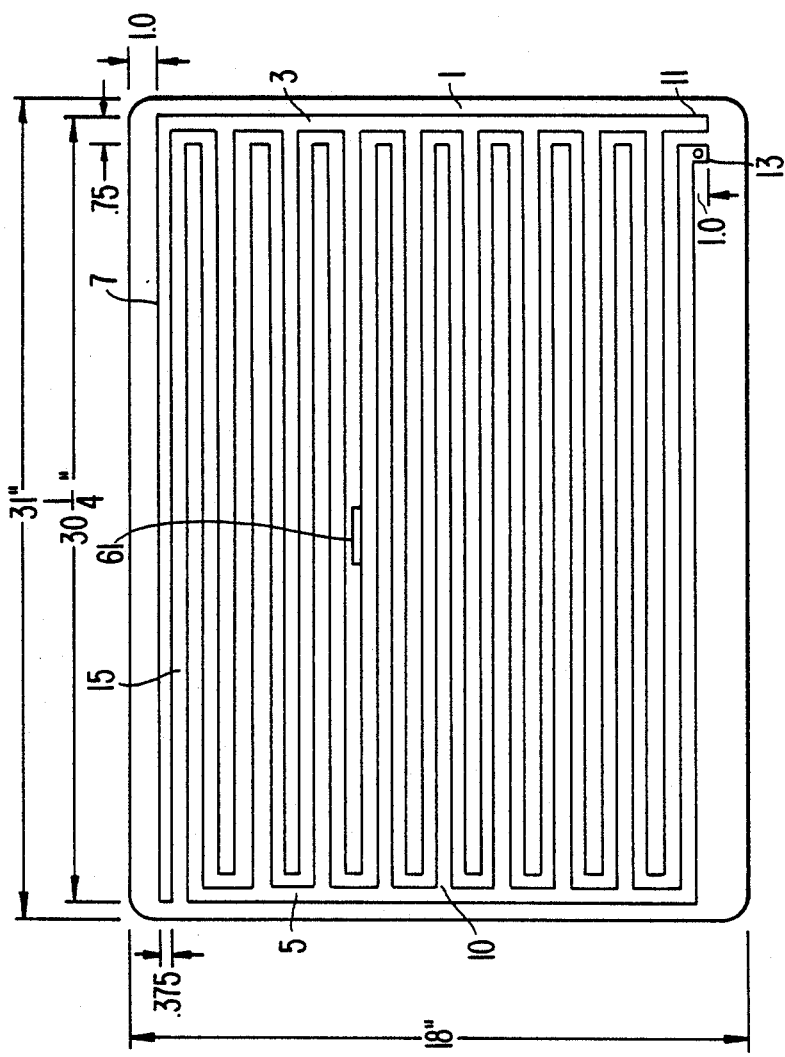

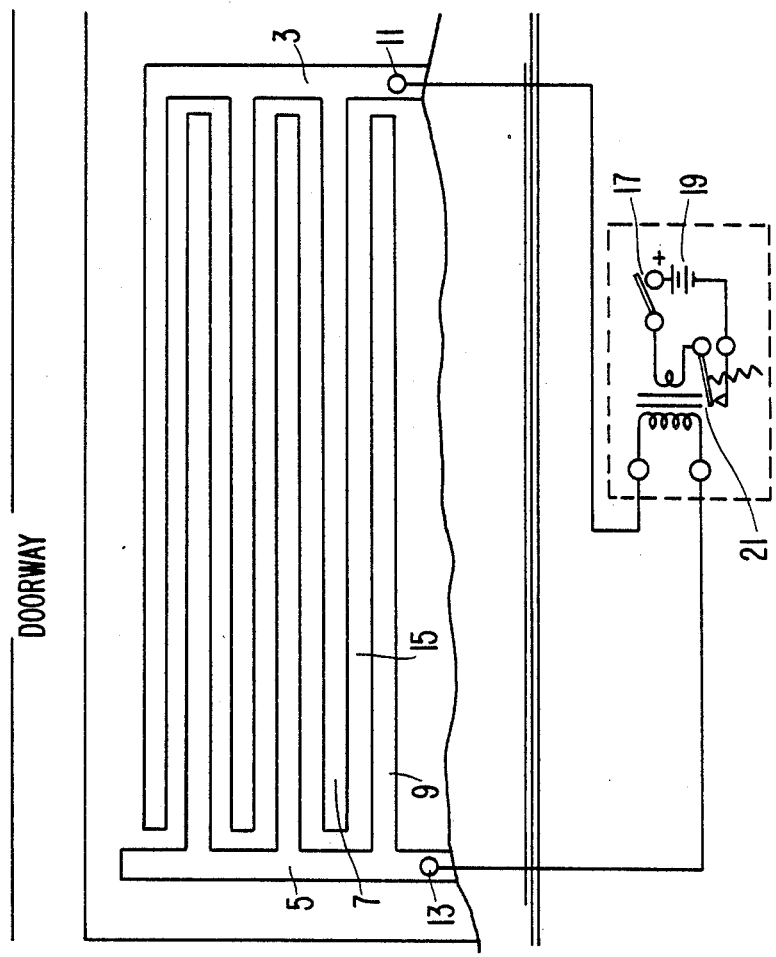

# ANIMAL TRAINING SYSTEM

BACKGROUND OF THE INVENTION

1. Field of the Invention

The invention disclosed is an animal training system which conditions an animal to remain in a confined area without crossing a predetermined border.

2. Description of Related Art

It is well known that animals respond to stimuli restricting mobility. As a result, electric fences have been widely employed Variations on such fences have included U.S. Pat. No. 2,500,311 to Fagen which teaches a system for switching on a high voltage pulse of limited duration to an electric fence after passage of a low voltage sensing current to ground. U.S. Pat. No. 2,555,180 to Adkins teaches an electric cattle guard or gateless gap in which a plurality of wires is placed laterally across a pad which is flush with the road. The wires are spaced in parallel relation and at opposite ends are secured to electric conducting bars connected to the fence wires. Animals passing through this gateless gap are shocked while rubber wheeled vehicles pass through safely. U.S. Pat. No. 796,241 to McNair teaches an interdigital array of fence wires U.S. Pat. No. 3,182,111 to Marateuch et al teaches the use of a low voltage source and an amplifier triggering a high potential generator only during periods of contact with the fence.

The Russian physiologist I. V. Pavlov discovered that if a first stimulus produces a reaction in an animal and the animal then experiences the first stimulus with a second stimulus, eventually the second stimulus alone will produce the same reaction when the first stimulus is absent. U.S. Pat. No. 4,202,293 to Gonda et al discloses a dog training collar which emits a characteristic sound whenever the dog barks and occasionally accompanies the sound with a light electrical shock to condition the dog to dislike the sound more than otherwise Gonda et al 4,335,682 teaches use of an additional sound prior to the onset of the aversive electrical stimulation to become a conditioned warning stimulus to the animal. Eventually, the electrical stimulation need not be used to control the animal's behavior. None of the systems disclosed uses a visual stimulus to control passage of an animal.

SUMMARY OF THE INVENTION

In view of the above, it is an object of the invention to provide a system to deter an animal's passage along a prohibited path without inconvenience to people.

It is a further object of the invention to supply a system with an aversive component to impart electrical shocks to train the animal not to cross the prohibited path and a visually detectable passive component to deter the animal when the aversive component is disconnected.

It is a further object of the invention to provide a simple means of disengaging the power supply to the aversive component without obstructing the passage.

It is a further object of the invention to provide a low power consumption device which is activated only upon contact with an aversive component.

To effect the above objects of the invention, an insulating mat with an interdigital array observable by the animal is connected to a removable power supply. When connected, the power supply operates on low voltages and provides a mild shock to the animal when it traverses onto the interdigital array. As the animal is trained, the power supply is removed and an animal who sees the interdigital array pattern does not cross the mat. This system can also be provided with separate light, sound, and olfactory stimuli to condition the animal.

BRIEF DESCRIPTION OF THE DRAWINGS

FIG. 1 is a top view of a mat containing an interdigital electrode array.

FIG. 2 is a side view of the mat containing an interdigital electrode array.

FIG. 3 is a simplified view of the power supply connected to the array;

DETAILED DESCRIPTION OF THE PREFERRED EMBODIMENTS

Figure 4:
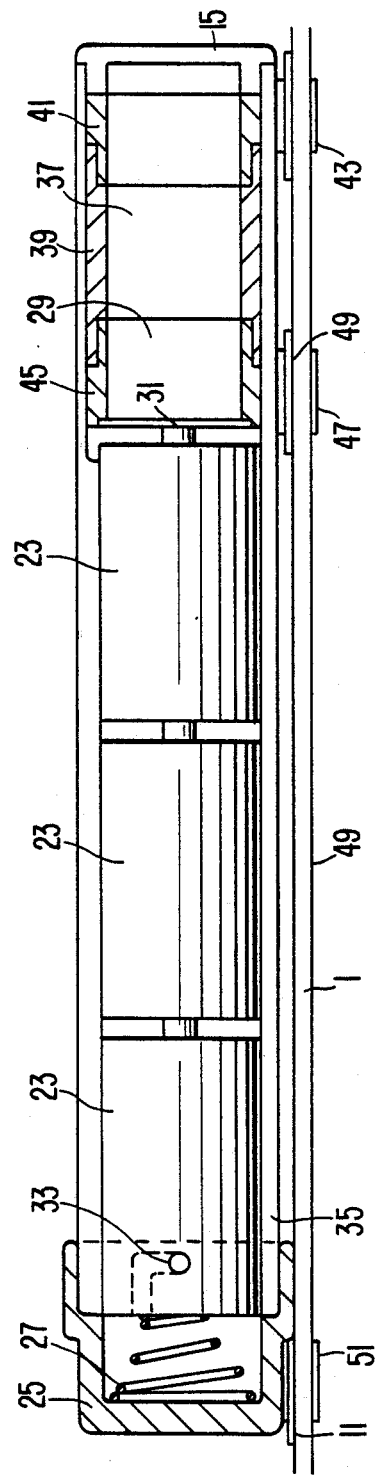
FIG. 4 is another view of a removable power supply.

Referring to FIGS. 1 and 3, insulating mat 1 has electrodes 3 and 5 placed or printed on it. Electrodes 3 and 5 have fingers 7 and 9 spaced between each other to form the interdigital array 10. Either the interdigital array or the insulating background is formed of light reflective material in order to be observed by an animal. Electrodes 3 and 5 also have contacts 11 and 13 for connection to a power supply. The mat may be of any suitable dimension and is typically 18 inches by 31 inches for placement through a typical home doorway. Each finger 7 and 9 typically has a width of 0.375 to 0.05 to 0.50 inches. Fingers 7 and 9 are typically spaced 0.50 inches from each other to form insulating gaps 15. The mat may also be formed of flexible reinforced vinyl sheeting which can be rolled for shipment and cut to fit other size passaways.

The electrode array is energized by an electrically powered circuit. The circuit provides a mild shocking electrical pulse between adjacent electrodes. The pulse width and duration is limited to provide harmless shocks when a animal steps onto the pad. For example, when switch 17 is closed connecting vibratory transformer 21 to battery 19, an animal stepping on the pad will receive a mild shock.

A battery powered supply is shown in FIG. 4, although the use of other electrical power sources is also possible. Three D cell batteries 23 are series connected between contact point 31 of timer 29 and conical spring 27 mounted on end cap 25. End cap 25 is retained to the body tube 35 by bayonet-type contact 33. Timer module 29 is connected to inverter module 37. Typically, a 5 volt d.c. to 200 volt, 400 cycle inverter module, such as one produced by E.R.G. Inc., is used. The timer module and inverter module are both contained in a timer/inverter insulating body tube 39. PVC material is one example of material that can be used to form insulating body tube 39. Electroconductive ring 41 connects the inverter module to clip 43 which contacts electrode array contact 13. Electroconductive ring 45 connecting the module to clip 47 makes electrical contact with conductive strip 49. Conductive strip 49 makes contact with clip 51 located near the end cap 25. Clip 51 connects to electrode contact 11. The system is switched on by sliding the tubular power supply onto the mat connecting clip 51 to clip 47 via conductor strip 49.

Figure 5:
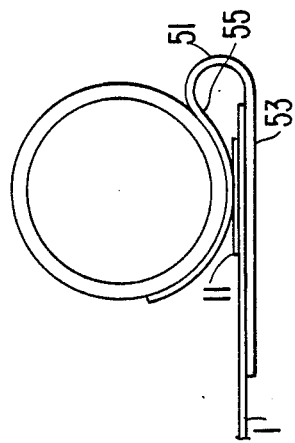
FIG. 5 is a side view of the power supply connection to the electrode array.

FIG. 5 shows a detailed view of clip 51, which is the same in construction as clips 47 and 43. As FIG. 4 illustrates, tubular enclosure 35 is located in one portion of generally S-shaped clip 51. Clip 51 has an elongated end 53 which slides under mat 1 so that a portion of S-shaped end 55 comes into contact with electrode contact 11. This arrangement facilitates sliding the power supply on and off the mat so as to make contact with the electrode contacts.

Figure 6:
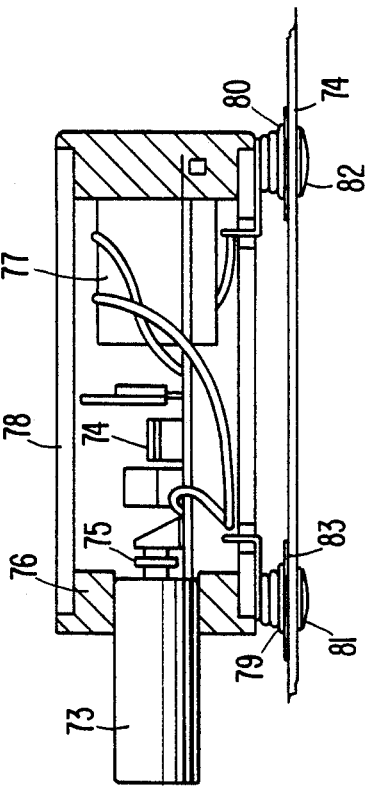
FIG. 6 is a side view of another power supply.

Another version of a power supply, shown in FIG. 6, eliminates the long tubular shape and is connected to the mat by snap means. A 9 volt battery 73 is connected to the pulse timer circuit board 74 by attachment to snap fastener terminals 75 through end cap 76. The pulse timer circuit is connected to inverter module 77. Typically a 9 volt D.C. to 200 volt, 400 cycle module, such as one produced by ERG Inc., is used. The pulse timer and inverter module are both contained in a PVC body tube 78. The 200 volt, 400 cycle output from the inverter module is connected to the interdigital electrode array by engagement of the female snap fastener parts 79 and 80 with male snap fastener parts 81 and 82, electrically connected to the electrodes 83 and 84 mounted on the surface of the mat. This arrangement facilitates attachment and removal of the power supply. The system is switched on by insertion of battery 73 when the power supply is attached.

In operation, mat 1 having the interdigital array of electrodes is placed in a doorway through which one wishes to restrict animal passage. The graphic pattern of the interdigital array 10 is visible to the animal. When the power supply is connected, an animal who strays through the doorway receives a shock. Eventually, the animal becomes conditioned to associate the graphic pattern of the high contrast interdigital electrodes on the pad with the unpleasant experience of a shock and learns not to cross the interdigital array. Subsequently, the power supply can be removed and the animal, recognizing the interdigital array, will not traverse the pattern.

In another version of the invention, the pad with interdigital electrodes can be covered with a perforated top sheet and sealed around its edges to a bottom supporting sheet of plastic, typically vinyl, as shown by reference numerals 55 and 57 of FIG. 2. A space between the top and bottom sheet contains a layer of open cell plastic foam 59 which emits an unpleasant substance to the animal when it is expelled through the holes 200 in the top sheet 55. This reinforces the graphic association of the pad with the prior aversive experience of electric shock. The odor may be generated by injecting the plastic foam with substances such as anthracene or an ammonia solution. For example, the open cell plastic foam can be soaked with about 5 cc of ammonia solution. The passive pad can also be made separately using dark plastic foam strips visible through the transparent top sheet 55 to appear somewhat like the electrode array used to train the dog.

It is also possible to provide a sonic or ultrasonic sound coincident with the electric shock provided by the aversive system. Thus, the animal becomes conditioned to avoid the array by the pulse of sonic or ultrasonic sound. In this system, the mechanism to generate the electric shock can be removed and a lower voltage and current can be applied to activate the sound when the animal treads on the array. Thus, applying the principles discussed above, the animal will be deterred from crossing the array.

Another approach to reinforcing conditioning of the animal is to supply the system with electroluminescent lamp 61 to show that a voltage exists between the electrodes. Electroluminescent lamps can be energized by the shocking voltage acting as a stimulus to the animal so that it associates the mild electric shock with a flashing light in synchronization with the shocking voltage. This constitutes the aversive system. In the passive system, the electroluminescent lamp may be attached to the surface of a simulation of the interdigital electrode array to cause the animal to think it is confronted with the active system. Thus, the animal will become conditioned to avoid the array.

As discussed above, the passive system can result from merely removing the clip-on power supply or can be supplied separately.

While several embodiments of the invention have been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. An aversive animal training system configured as a pad comprising:
    (a) an insulating backing member forming a passive mat;
    (b) an interdigital electrode array positioned on the pad;
    (c) a shocking voltage means connected to said array;
    (d) means for emitting a substance unpleasant to an animal treading on the pad, the means further comprising a perforated top sheet over and a bottom sheet under the insulated mat the sheets being sealed together around the edges of the mat and forming a space;
   a layer of material injected with a substance unpleasant to an animal, the material being positioned to emit the unpleasant substances through perforations in the top sheet when the animal treads on the pad.

2. A method of training animals comprising the steps of:
    placing an active component of an aversive system, positioned on an insulating member forming a passive mat, and further having an interdigital array visible to an animal and a shocking means connected to the array along a path prohibited to an animal;
    mildly shocking an animal when it treads into the interdigital array;
    emitting a substance unpleasant to an animal treading on the interdigital array the unpleasant substance being injected into a layer of material positioned to emit the substance through perforations in a top sheet covering the mat; and
    removing the shocking means when the animal is conditioned visually to recognize and avoid the array.

* * * * *